US012638374B2

(12) United States Patent
Maldzius et al.

(10) Patent No.: US 12,638,374 B2
(45) Date of Patent: May 26, 2026

(54) METHOD AND DEVICE FOR EVALUATING THE PERMEABILITY OF A SAMPLE

(71) Applicant: Stora Enso OYJ, Helsinki (FI)

(72) Inventors: Robertas Maldzius, Vilnius (LT);
Jonas Sidaravicius, Vilnius (LT);
Tadeus Lozovski, Vilnius (LT); **Kaj
Backfolk, Villmanstrand (FI); Isto
Heiskanen**, Imatra (FI)

(73) Assignee: Stora Enso OYJ, Helsinki (FI)

( * ) Notice: Subject to any disclaimer, the term of this
patent is extended or adjusted under 35
U.S.C. 154(b) by 330 days.

(21) Appl. No.: 18/552,270

(22) PCT Filed: Mar. 25, 2022

(86) PCT No.: PCT/IB2022/052762
§ 371 (c)(1),
(2) Date: Sep. 25, 2023

(87) PCT Pub. No.: WO2022/201121
PCT Pub. Date: Sep. 29, 2022

(65) Prior Publication Data
US 2024/0192115 A1 Jun. 13, 2024

(30) Foreign Application Priority Data
Mar. 26, 2021 (SE) ..................................... 2150362-8

(51) Int. Cl.
*G01N 15/08* (2006.01)
(52) U.S. Cl.
CPC .................................. *G01N 15/082* (2013.01)

(58) Field of Classification Search
CPC ....... G01N 15/00; G01N 15/08; G01N 15/082
See application file for complete search history.

(56) References Cited

U.S. PATENT DOCUMENTS 5,591,898 A 1/1997 Mayer
8,314,622 B2 * 11/2012 Uchiyama ......... H01M 8/04089
324/718
(Continued)

FOREIGN PATENT DOCUMENTS

CN 108663301 A 10/2018
CN 111474101 A 7/2020
(Continued)

OTHER PUBLICATIONS

International Search Report from corresponding PCT application
No. PCT/IB2022/052762, mailed May 11, 2022.
(Continued)

*Primary Examiner* — Nguyen Q. Ha
(74) *Attorney, Agent, or Firm* — Greer Burns & Crain
Ltd.

(57) ABSTRACT

The present invention relates to an arrangement for deter-
mining the permeability of a sample, said arrangement
comprising a source of fluid medium arranged such that at
least a fraction of said medium can be brought into contact
with a first surface of said sample to be tested; means for
measuring the electrical properties at a second surface of
said sample, wherein the second surface is opposite said first
surface of said sample; and a controller for recording said
electrical properties, and for determining the transmission
rate of the fluid medium through the sample based on the
recorded electrical properties.

11 Claims, 2 Drawing Sheets

Schematic view of an example of a detection arrangement

(56)          References Cited

U.S. PATENT DOCUMENTS

2002/0162384 A1   11/2002  Sharp et al.
2007/0292957 A1   12/2007  Chua et al.

FOREIGN PATENT DOCUMENTS

DE          3926333  A1    2/1991
EP          1255104  A1   11/2002
JP        2001264237  A     9/2001
KR        101912810  B1   10/2018
SU          1553885  A1    3/1990
WO          0050158        8/2000
WO        2005095924  A1   10/2005
WO        2014119690  A1    8/2014
WO    WO-2019034888  A1  *  2/2019   ......... G01N 21/8422

OTHER PUBLICATIONS

Extended European Search Report from corresponding European
application No. 22774484.4, dated Jan. 16, 2025.

\* cited by examiner

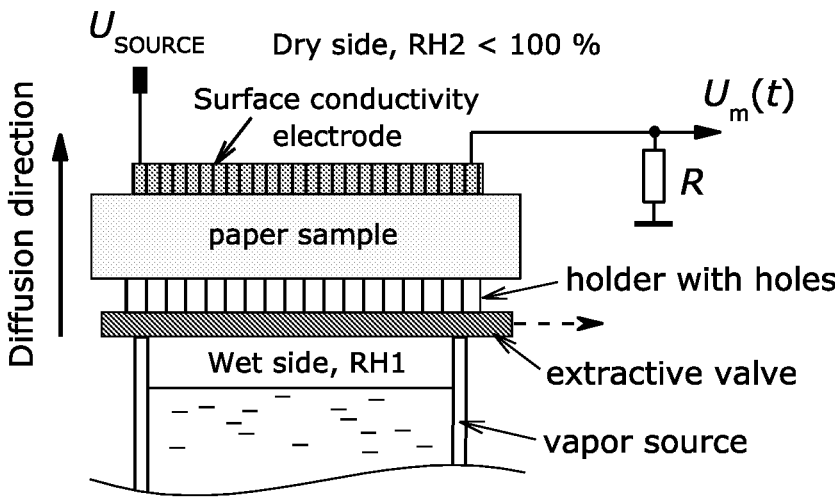
Figure 1. Schematic view of an example of a detection arrangement
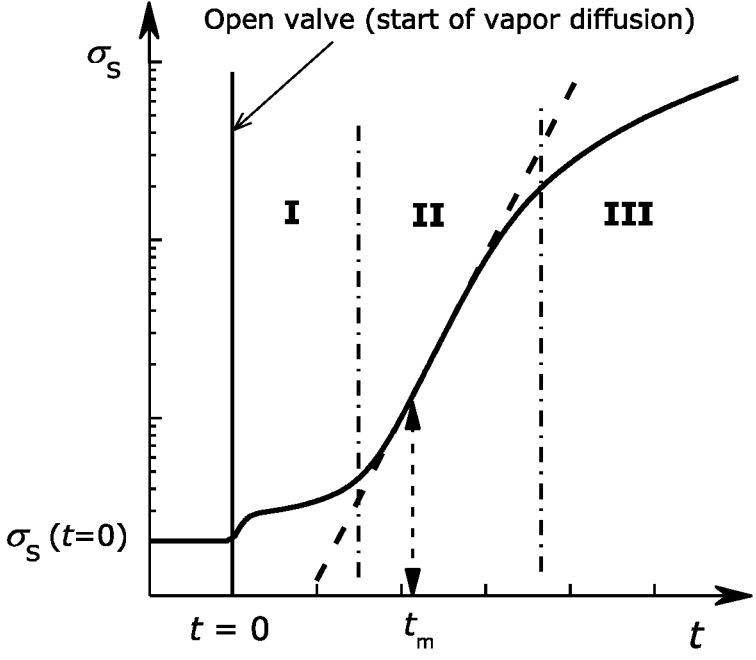
Figure 2. Graph showing surface conductivity time change in logarithmic scale

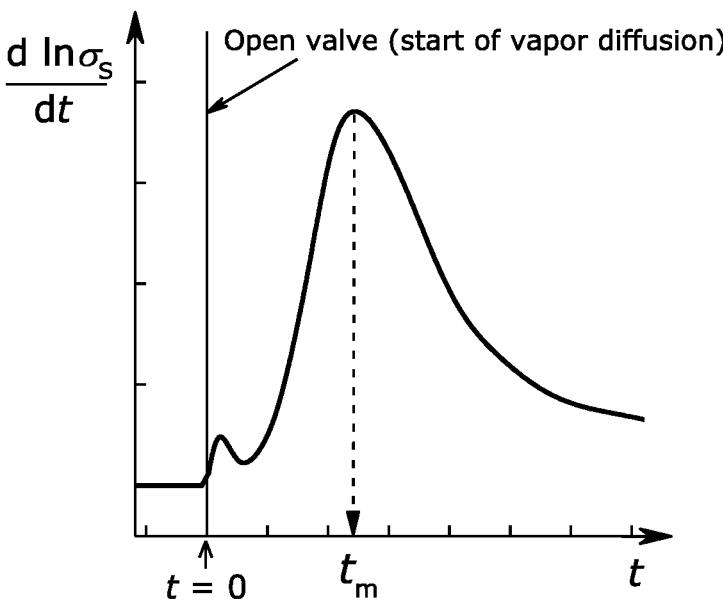
Figure 3. The first order derivative of the surface conductivity change
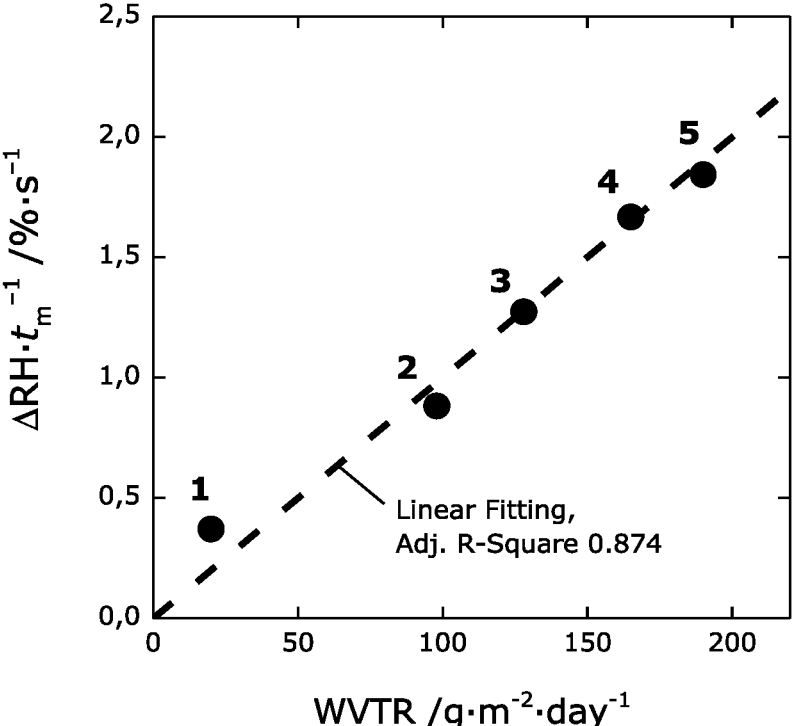
Figure 4. Correlation between $t_m{}^{-1}$ and ISO 1506-2 WVTR

METHOD AND DEVICE FOR EVALUATING THE PERMEABILITY OF A SAMPLE

This application is a U.S. National Phase under 35 U.S.C. § 371 of International Application No. PCT/IB2022/052762, filed Mar. 25, 2022, which claims priority under 35 U.S.C. §§ 119 and 365 to Swedish Application No. 2150362-8 filed Mar. 26, 2021.

TECHNICAL FIELD

The present invention relates to a method and device for determining the permeability of a sample.

BACKGROUND

Knowledge about barrier properties, e.g. against water vapor, is important to packaging materials industries. For example, cellulose-based package products are usually moisture sensitive, and controlling the water vapor into or out of a package is necessary in order to assure a good quality of a product until it is opened by a customer. All materials permeate to various degrees, and knowing how much and how fast e.g. vapor permeates into/out of a package over a given period of time will allow for optimizing the package material to a certain product.

Permeation can be explained to occur in a three-step process. Firstly, the permeant (e.g. gas or vapor) is absorbed into the material surface, referred to as "sorption". Secondly, the permeant diffuses into and through the polymer, and thirdly, it desorbs or outgases from the opposite side.

Various methods for determining the permeability and/or transmission of a film or sheet material to be used in packaging materials exist. One way of performing vapor permeability measurements is under equilibrium conditions, where a vapor or gas source is confined in a chamber on one side of a membrane, and a vapor or gas detector is connected to a chamber on the other side of the membrane, and conditions are held constant until the vapor or gas permeating through the membrane reaches a constant level, whereas much vapor or gas leaves the downstream side of the membrane as enters the upstream side of the membrane.

In patent document US2002/162384 there is described an apparatus for the simultaneous determination of permeation rate through, and desorption rate from a polymeric specimen, wherein a first volume is sealingly separated from a second volume with a specimen to be tested. A gas is flown through the first chamber and a carrier gas is flown in the second chamber. The gas portion permeated into the second chamber and present in the flow of the carrier gas exiting from said second chamber is measured.

It is also possible to measure the vapor or gas transmission characteristics by a process that measures the outgassing characteristics of the material. In this circumstance, the material is first saturated in the gas or vapor of interest, and then is placed in a closed chamber where the vapor which outgasses from the material can be measured. The rate at which the vapor outgasses provides a measure of the vapor transmission characteristics of the material. An apparatus and method which describes this technique is found in U.S. Pat. No. 5,591,898, issued Jan. 7, 1997, entitled "Method for Measuring Material Permeability Characteristics."

Each of the foregoing processes requires a considerable amount of time before a result can be determined, as it can take many hours for the conditions to stabilize.

It would be desirable to provide a quicker as well as a more reliable test method for determining the transmission rate of a material such as a thin film, sheet or laminate intended for use as a package material.

SUMMARY

It is an object of the present invention to provide a quick and reliable way to determine permeability of a sample material.

The object of the invention is reached by means of an arrangement for determining the permeability of a sample, said arrangement comprising:
- a source of fluid medium arranged such that at least a fraction of said medium can be brought into contact with a first surface of said sample to be tested;
- means for measuring the electrical properties of said sample at a second surface of said sample, wherein the second surface is opposite said first surface of said sample;
- a controller for recording said electrical properties, and for determining the transmission rate of the fluid medium through the sample based on the recorded changes of electrical properties over time.

The skilled person understands that the term "fluid" here is interpreted to include liquid, gas and vapor: that is, referring to a state in which substances continually deform (flows) under applied stress. Thus, according to one aspect of the present invention, said fluid medium can be in gas or liquid state. It can also be in the form of a vapor (i.e. in gas phase at a temperature lower than its critical temperature) such as water vapor.

The skilled person further understands that said means for measuring electrical properties is arranged to measure the sample material directly, i.e. measure the electrical property such as electrical conductivity of the sample itself. Thus, the proposed method and device are based on the direct measuring of the surface electrical conductivity changes in time. When vapour penetrates the sample from the wet space to the dry space surface, electrical conductivity increases which can be measured and used as basis for determine permeability of a material.

According to another aspect of the invention, the fluid medium comprises molecules having an electric dipole moment, i.e. containing polar bonds due to difference in electronegativity between bonded atoms.

According to one aspect of the present invention, said sample is a single-ply or multi-ply flat sheet. Further, the sample may be cellulose-based or lignocellulose-based, including any one of a packaging paper, paperboard, film laminate or a coated fiber-based substrate (e.g. a barrier coated paper). According to the invention, the sample is of a material which changes its electrical properties upon contact with a fluid medium having an electric dipole moment, e.g. paper sample and water vapor.

It is also conceivable that the sample is a barrier material based on synthetic polymer or organic polymer, such as polyvinyl alcohol (PVOH), polyolefins such as polyethylene or polypropylene, ethylene vinyl alcohol, polyamide, polyvinylidene chloride, or polyesters, hemicellulose, starch or starch derivatives, cellulose derivatives, other natural polysaccharides, acrylates or copolymers thereof, nanocellulose, nanocrystalline cellulose, regenerated cellulose, PLA, PGA, PHA, PBS, and other biobased polymers and/or blends thereof suitable for barrier and food or non-food packaging. The sample may also be a multilayer structure comprising one or more cellulose-based layers, and one or more coating/barrier layers for instance comprising synthetic polymers.

According to another aspect of the present invention, the arrangement is suitable for determining the permeability of vapor or gas through a cellulose-based sample in the form of a film or sheet material, and said electrical property is electrical conductivity. The arrangement comprises a vapor/gas source arranged such that at least a fraction of vapor/gas can contact said first surface of said cellulose-based sample, means for measuring the surface electrical conductivity of said sample at the second surface opposite to the vapour contacting surface, and a controller for recording said measured surface electrical conductivity over time, and for determining the vapor transmission rate through the sample based on the surface electrical conductivity recorded over time.

Thanks to the arrangement of the invention, there is provided an efficient and quick detection method for determining the vapor transmission rate of a material, where a result can be achieved in only a few minutes. Another advantage provided by the present invention is that it can be used on very thin material samples, such as $\geq 5$ g/m², or $\geq 10$ g/m². Moreover, the method of the invention provides a reliable way of achieving information about the kinetics of the sample vapor sorption. This is advantageous because knowledge about kinetics provides faster recording time of barrier properties, more accurate information related to diffusion at short exposure times, and simultaneous influence on electrical properties. The method is also easy to modify to test barrier properties in various environments and conditions, including vapor diffusion from polar liquids such as water, but also solvents or mixtures thereof. Yet another advantage is that at least one of the sides of the substrate can be pressurized and that other conditions such as humidity or temperature can be adjusted. The method allows for example very hot vapor to be tested in terms of diffusion, and to evaluate hot moisture/vapor resistance of barrier materials. Also, this allows barrier materials to be pre-tested in terms of sterilization (high temperature).

According to yet another aspect of the present invention, the means for measuring electrical surface conductivity comprises a voltage source, a surface conductivity electrode and an electric current measuring unit. In a preferred embodiment, the means for measuring electrical surface conductivity also comprises a data acquisition board, computer and software.

According to yet another aspect of the present invention, the controller for recording said measured surface electrical conductivity is arranged to determine the sample vapor transmission rate from the measured changes in electrical surface conductivity over time.

The present invention also relates to a method for determining the permeability of a sample, said method comprising the steps of:

arranging said sample such that at least a fraction of a fluid medium can contact a first surface of the sample;
  continuously measuring and recording the electrical properties at a second surface of said sample over a period of time, wherein the second surface is opposite said first surface of said sample, and where said period of time starts at the moment when said fraction of vapor contacts the sample; and
  determining the transmission rate of the fluid medium through the sample based on the recorded surface electrical property changes in time.

BRIEF DESCRIPTION OF THE DRAWINGS

In the following, embodiments of the invention will be described with reference to the drawing, of which:

FIG. 1 is a schematic view of an example of an arrangement for determining the permeability of a vapor through a sample according to the invention;

FIG. 2 is a graph showing surface conductivity time change in logarithmic scale;

FIG. 3 shows the first order derivative of the surface conductivity change; and

FIG. 4 shows the correlation between $t_m^{-1}$ and ISO 1506-2 WVTR.

DETAILED DESCRIPTION

The following detailed description of various embodiments of the invention is merely exemplary in nature and is not intended to limit the inventive subject matter or the application and uses of the inventive subject matter.
Cellulose-Based Sample As used herein, "cellulose-containing sample" or "cellulose-based sample" means a sample composition which consists essentially of cellulose. For example, such material may include, but is not limited to, paper, paper sheets, paperboard, films, a paper or carton for food storage, glassine paper, parchment paper, cake board, butcher paper, release paper/liner, a bag for food storage, a shopping bag and a shipping bag. It can also be a moulded fiber product or regenerated cellulose film.

The present technology may be applied to cellulose-based samples such as packaging paper, paperboard and cellulose-based films, for example nanocellulose or MFC films (i.e. films comprising MFC).

Paperboard is commonly known as "card" or "cardboard". A paperboard normally has a grammage above 190 g/m². Paperboard can be single- or multi-ply. The paperboard used herein may refer to a baseboard for liquid paperboard, a cup stock or other food packaging applications. The paperboard may be uncoated paperboard, surface sized paperboard, pigmented paperboard or single mineral coated paperboard.

The cellulose-based sample may also be a film such as a microfibrillated cellulose (MFC) films or films comprising a high amount of MFC, in which defibrillated cellulosic fibrils have been suspended e.g. in water, re-organized and rebonded together, thus forming a film that is predominantly continuous and provides good gas barrier properties.
Microfibrillated Cellulose (MFC)

Microfibrillated cellulose (MFC) shall in the context of the patent application mean a cellulose particle, fiber or fibril having a width or diameter of from 20 nm to 1000 nm.

Various methods exist to make MFC, such as single or multiple pass refining, pre-hydrolysis followed by refining or high shear disintegration or liberation of fibrils. One or several pre-treatment steps is usually required in order to make MFC manufacturing both energy efficient and sustainable. The cellulose fibers of the pulp used when producing MFC may thus be native or pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

MFC can be produced from wood cellulose fibers, both from hardwood or softwood fibers. It can also be made from microbial sources, agricultural fibers such as wheat straw pulp, bamboo, bagasse, or other non-wood fiber sources. It can be made from pulp, including pulp from virgin fiber, e.g. mechanical, chemical and/or thermomechanical pulps. It can also be made from broke or recycled paper.

In the following, the arrangement and the method according to the invention will be described in an exemplary way.

In FIG. 1 there is seen a schematic view of an arrangement for determining/detecting the permeability of a vapor through a cellulose-based sample ("paper sample"). Said arrangement may herein also be referred to as "detection arrangement". The detection arrangement comprises a vapor source, a removable valve (an extractive valve) and a sample holder, said holder being positioned so that vapor may contact a first surface of the sample upon activation (i.e. by removing the valve) of the arrangement. The detection arrangement also includes means for measuring surface electrical conductivity of said sample. Means for measuring surface electrical conductivity comprises voltage source, surface conductivity electrode and an electric current measuring unit consisting of data acquisition board, computer and software.

Moreover, the proposed method and device are based on the recording and analysis of the electrical conductivity changes in time. The rate of electrical conductivity change in time is not linear, not even in semi logarithmic scale. Therefore, it is difficult to determine the part of the dependence curve for the vapour penetration rate. However, recording of the full curve enables to determine the point which characterises the penetration rate. This point is at time when electrical conductivity change is fastest.

EXAMPLES

Example 1

The vapour source (corresponding to relative humidity RH1) was closed by the removable valve. A paper sample to be evaluated was placed on the valve film, and a surface conductivity electrode was attached. All procedures were performed in a climatic chamber (corresponding to relative humidity RH2). If cellulose barrier film was not conditioned, cellulose barrier film was kept in equilibrium conditions of climatic chamber enough time for being conditioned, whereafter measuring of the surface conductivity $\sigma_s$ (0) was started. The recording device measured the electric current generated by a voltage source. The conductivity was then calculated when the surface electrode geometry was known:

$$\sigma_s(t) = GF \cdot \frac{U_m(t)}{U_{SOURCE}},$$

where GF means geometry factor of the surface electrode.

After that the valve was removed, the water vapour started to penetrate into the sample and diffusion process began due to the vapor concentration gradient (RH1-RH2). Here, d is paper thickness.

Diffusing water vapour in the paper volume is a flow of moisture. When moisture reached the second surface of the paper sample, opposite said first surface, its electrical surface conductivity changed. Surface conductivity began to increase and conductivity changes (kinetics) were recorded. The invention makes use of the insight that surface electrical conductivity is proportional to moisture content, and kinetics is presented in logarithmic scale (see FIG. 2).

Referring to FIG. 2, the surface electrical conductivity time-dependency consists of three parts. The first slow part is vapour sorption by cellulose barrier film. The second part is fast and in logarithmic scale dependence is linear indicating steady vapor flow, i.e. vapor diffusion. Then, diffusion rate which is directly connected with vapour transmission rate is characterised by the time constant $t_m$ of the exponential dependence. At higher $t_m$ vapor transmission rate is lower and vice versa. The linearity is not exact, and the time constant $t_m$ is preferably determined when the changes are fastest. This time $t_m$ is determined from the dependence first order derivative (FIG. 3).

Measuring time is less than 10 min.

Example 2

Usually water vapor transmission rate is expressed in $gm^2/day$. Tests were done with different cellulose barrier films and the correlation between $t_m^{-1}$ and WVTR (ISO 1506-2) was determined. The test samples used were cellulose-based barrier films comprising a high amount of microfibrillated cellulose and are summarized in Table 1 as Samples No. 1-5. It was concluded that the dependency is linear (see Table 1 and FIG. 4) and can be expressed by formula:

$$WVTR \left[ g \cdot m^2 \cdot day^{-1} \right] = 100 \cdot \frac{\Delta RH \,[\%]}{t_m [s]}.$$

TABLE 1

List of cellulose barrier films under test and measuring data

| | | | | WVTR/g · m$^{-2}$ · day$^{-1}$ | |
| Sample # | Thickness/ μm | ΔRH/ % | $t_m$/s | Surface conductivity kinetics | Standard ISO 1506-2 |
|---|---|---|---|---|---|
| 1 | 50.0 | 50 | 135.0 | 37 | 20 |
| 2 | 41.7 | 62 | 70.3 | 88 | 98 |
| 3 | 27.9 | 62 | 48.7 | 127 | 128 |
| 4 | 54.3 | 50 | 30.0 | 167 | 165 |
| 5 | 61.7 | 70 | 38.0 | 184 | 190 |

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An arrangement for determining a permeability of a sample, said arrangement comprising:
   a source of fluid medium arranged such that at least a fraction of the fluid medium is configured to contact a first surface of a sample to be tested;

means for measuring an electrical property of the sample at a second surface of the sample, wherein the second surface is opposite said first surface of the sample; and a controller for recording said electrical property, and for determining a transmission rate of the fluid medium through the sample based on recorded changes of the electrical property over time.

2. The arrangement according to claim 1, wherein the sample comprises a single-ply or multi-ply sheet, and wherein the sample further comprises a cellulose-based or lignocellulose-based sample.

3. The arrangement according to claim 1, wherein the sample comprises a material which changes the electrical property upon contact with a fluid medium having an electric dipole moment.

4. The arrangement according to claim 1, wherein the sample comprises a synthetic polymer, an organic polymer, polyvinyl alcohol (PVOH), a polyolefin, polyethylene, polypropylene, ethylene vinyl alcohol, polyamide, polyvinylidene chloride, a polyester, hemicellulose, starch or starch derivatives, cellulose derivatives, natural polysaccharides, acrylates, acrylate copolymers, nanocellulose, nanocrystalline cellulose, regenerated cellulose, PLA, PGA, PHA, PBS, a biobased polymer, or any combination thereof.

5. The arrangement according to claim 1, wherein the sample comprises a multilayer structure.

6. The arrangement according to claim 1, wherein the fluid medium is in a liquid, gas, or vapor state.

7. The arrangement according to claim 1, wherein the fluid medium comprises molecules having an electric dipole moment.

8. The arrangement according to claim 1, wherein the sample is a cellulose-based sample in a form of a film or sheet material, wherein said electrical property is electrical conductivity, and wherein the fluid medium comprises a vapor.

9. The arrangement according to claim 8, wherein the means for measuring electrical conductivity comprises a voltage source, a surface conductivity electrode, and an electric current measuring unit.

10. The arrangement according to claim 8, wherein the controller is arranged to calculate, from a measured conductivity, time changes of vapor transmission rate.

11. A method for determining a permeability of a sample, said method comprising the steps of:

arranging a sample such that at least a fraction of a fluid medium contacts a first surface of the sample;

continuously measuring and recording an electrical property at a second surface of the sample over a period of time, wherein the second surface is opposite said first surface of the sample, and wherein said period of time starts when said fraction of vapor contacts the sample; and determining a transmission rate of the fluid medium through the sample based on a recorded surface electrical property changes in time.

* * * * *